US010032387B2

(12) United States Patent
Jones et al.

(10) Patent No.: US 10,032,387 B2
(45) Date of Patent: Jul. 24, 2018

(54) WIRELESS IMMERSIVE SIMULATION SYSTEM

(71) Applicant: Cubic Corporation, San Diego, CA (US)

(72) Inventors: Michael Jones, Orlando, FL (US); Fitz McKinzie, Orlando, FL (US)

(73) Assignee: CUBIC CORPORATION, San Diego, CA (US)

( * ) Notice: Subject to any disclaimer, the term of this patent is extended or adjusted under 35 U.S.C. 154(b) by 0 days.

(21) Appl. No.: 15/355,553

(22) Filed: Nov. 18, 2016

(65) Prior Publication Data

US 2017/0069217 A1   Mar. 9, 2017

Related U.S. Application Data

(62) Division of application No. 13/948,992, filed on Jul. 23, 2013.

(60) Provisional application No. 61/674,698, filed on Jul. 23, 2012.

(51) Int. Cl.
*G09B 9/00* (2006.01)
*F41A 33/00* (2006.01)

(52) U.S. Cl.
CPC .............. *G09B 9/003* (2013.01); *F41A 33/00* (2013.01)

(58) Field of Classification Search
CPC ................................. G09B 9/003; F41A 33/00
USPC .......................................................... 434/11
See application file for complete search history.

(56) References Cited

U.S. PATENT DOCUMENTS

| | | | |
|---|---|---|---|
| 6,140,943 A | 10/2000 | Levine | |
| 6,630,915 B1 | 10/2003 | Flood | |
| 8,920,172 B1 | 12/2014 | Wilmink et al. | |
| 2005/0282633 A1 | 12/2005 | Nicolas et al. | |
| 2006/0258454 A1 | 11/2006 | Brick | |
| 2007/0069977 A1 | 3/2007 | Adderton | |
| 2009/0033588 A1 | 2/2009 | Kajita et al. | |

(Continued)

FOREIGN PATENT DOCUMENTS

WO   2014/018561 A2   1/2014

OTHER PUBLICATIONS

Molner, et al.; "Immersion of a live individual combatant into a Virtual Battlespace"; Dayton Section Symposium, 1997; The 14th Annual AESS/IEEE—Fairborn, OH, USA; Apr. 9, 1997, New York, NY, USA, IEEE, US; Jan. 1, 1997; XP010226725; DOI: 10.1109/DAYTON.1997.595092; ISBN: 978-07803-3965-1; 7 pages.

(Continued)

*Primary Examiner* — Robert P Bullington
(74) *Attorney, Agent, or Firm* — Kilpatrick Townsend & Stockton LLP

(57) ABSTRACT

Computer-based systems provide a wireless, high fidelity, real-time video and audio immersive environment for multiple users. A user may be equipped with a head mounted display device which wirelessly receives real-time video signals transmitted by a radio transceiver linked to a computer that generates the real-time video images. Aspects include body, arm and leg motion and orientation sensors in wireless communication with a radio transceiver linked with a computer. Video images may be generated using a portable array of user dedicated computers controlled by a single computer that is controlled by an operator.

4 Claims, 12 Drawing Sheets

(56) References Cited

U.S. PATENT DOCUMENTS

2012/0070152 A1* 3/2012 Preston .................. F41A 33/02
                                                    398/115
2013/0274904 A1* 10/2013 Coza ....................... G06F 3/011
                                                    700/91

OTHER PUBLICATIONS

International Search Report and Written Opinion dated Feb. 5, 2014 for International Patent Application No. PCT/US2013/051734; all pages.

* cited by examiner

WIRELESS IMMERSIVE SIMULATION SYSTEM

CROSS-REFERENCE TO RELATED APPLICATIONS

The present application is a Divisional of U.S. patent application Ser. No. 13/948,992, filed Jul. 23, 2013, entitled, "WIRELESS IMMERSIVE SIMULATION SYSTEM,", which is a non-provisional of U.S. Patent Application No. 61/674,698, filed Jul. 23, 2012, entitled, "WIRELESS IMMERSIVE SIMULATION SYSTEM," all of which are hereby incorporated by reference in their entirety for all purposes.

BACKGROUND

Training for hazardous tasks, such as combat or firefighting, is often difficult or expensive to perform physically on training grounds. There could be numerous situations with very different physical surroundings, which would be expensive or time-consuming to create. Monitoring trainees' responses would also add difficulty and expense.

Training for such situations using simulated environments allows for greater safety in training, less expense in creating physical stages on training grounds, and much greater flexibility in the type and number of training scenarios presented to trainees. Simulated training is improved when an immersive experience is presented to the trainee. In immersive training, the trainee virtually experiences all aspects and sensations of the hazardous situation. Simulated or virtual immersive training situations often require a trainee to wear a portable computer attached by cabling or wires to computers controlled by operators or trainers. A trainee often wears a specialized vision helmet having a head-up display in front of the trainee's face to present virtual images of the training scenario. A trainee often wears a specialized suit with motion capture devices attached. The vision helmet and motion capture suit are also often attached by cabling to the trainers' computers. Such cabling is often used to provide the data rates need for high fidelity real-time video for presentation on the head-up display and to receive responses, both verbal and motion, from the trainee.

However, such specialized equipment attached to the trainee can compromise the verisimilitude of the simulation since the portable vision computer, vision helmet and motion capture suit present different weight and shape characteristics than the equipment that would actually be used by the trainee. For example, the vision helmet could be very different in size, shape or weight from a helmet worn by a soldier or by a firefighter. Further, cabling necessary for communications with the trainer's computers can greatly restrict the range of motion of the trainee.

So there is a need for ways to provide more realistic immersive training. Such training would allow the trainee to wear the equipment expected to be used for the situation. The additional monitoring and training equipment would be minimally intrusive and still provide realistic real-time video and audio communications with the trainee. In the case of team training, it would be advantageous for the training equipment to allow real-time communications between trainees in the team.

BRIEF SUMMARY

This Summary does not in any way limit the scope of the claimed subject matter.

In an embodiment, a system for providing a simulated immersive training environment is disclosed. The system may enable one or more trainees or users to experience computer-generated visual and/or auditory sensations of a situation in order to learn how to respond. The system may comprise at least one computer subsystem capable of generating a real-time video image sequence, a first radio transmitter/receiver communicatively linked with the computer subsystem and capable of transmitting the real-time video image sequence, a directional antenna communicatively linked with the at least one radio transmitter/receiver subsystem, and at least one Head-Mounted Display (HMD) device configured to be worn on a user and comprising a second radio transmitter/receiver capable of receiving the real-time video image sequence transmitted by the first radio transmitter/receiver and of displaying the real-time video image sequence on at least one screen positioned before the eyes of the user.

Additional and/or alternative embodiments may comprise any combination of the following elements. There may be a second antenna distinct from the directional antenna and communicatively linked with the first radio transmitter/receiver. The first radio transmitter/receiver may be capable of simultaneously transmitting a first radio signal on a first radio channel using the directional antenna and transmitting and/or receiving a second radio signal on a second radio channel, distinct from the first channel, using the second antenna. The real-time video image sequence may be transmitted on the first radio signal. The real-time video image sequence may comprise a 3-dimensional stereo image and be projected on dual screens of the HMD. The real-time video image sequence may be transmitted by the first radio transmitter/receiver using the 60 GHz frequency bands. The computer subsystem may be capable of generating a plurality of real-time video image sequences simultaneously. The computer subsystem may comprise a controller computer and a plurality of user-dedicated computers.

Additional and/or alternative embodiments of the system may comprise any combination of the following elements. There may be a user hand-held training device comprising a sensor that transmits information about the hand-held training device on the second radio channel. There may be user-mounted sensors which measure and transmit orientation information to the first radio transmitter/receiver using the second radio channel. The system may also comprise user-mounted microphone and/or speakers for transmitting and receiving audio communications on the second radio channel.

In another embodiment, a second system is disclosed for receiving a wirelessly transmitted simulated immersive training environment. The second system may comprise a HMD to be worn by a user and that includes a real-time video image sequence display device, a battery powered radio transmitter/receiver capable of receiving a real-time video image sequence on a first radio channel, and capable of simultaneously transmitting and/or receiving radio signals on a second radio channel distinct from the first channel, and an orientation sensor linked to the HMD. The HMD transmits orientation data on the second radio channel.

Additional or alternative embodiments of the second system may comprise any combination of the following elements or aspects. The HMD may be configured to be attached to the exterior of the surface of a helmet. The orientation sensor may be battery powered, with the battery being rechargeable from an inductive charger. The first radio channel may be in the 60 GHz band.

In another embodiment, a third system is disclosed for transmitting sensor data from a user within a simulated training environment, comprising: a battery powered orientation sensor attachable to the user, the orientation sensor comprising a radio transmitter/receiver; a hub radio transmitter/receiver and a system radio transmitter/receiver. The orientation sensor transmits an orientation measurement using the sensor radio transmitter/receiver to the hub radio transmitter receiver and receives signals from the hub radio transmitter/receiver. The hub transmitter/receiver transmits signals to the orientation sensor, receives the orientation measurement transmitted from the orientation sensor, and transmits the orientation measurement to the system radio transmitter/receiver. Additional and/or alternative embodiments may comprise any combination of the following aspects. The hub transmitter/receiver is battery powered. An orientation sensor may also detect motion and/or position. The hub radio transmitter/receiver attaches to a device held by the user during a simulation.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
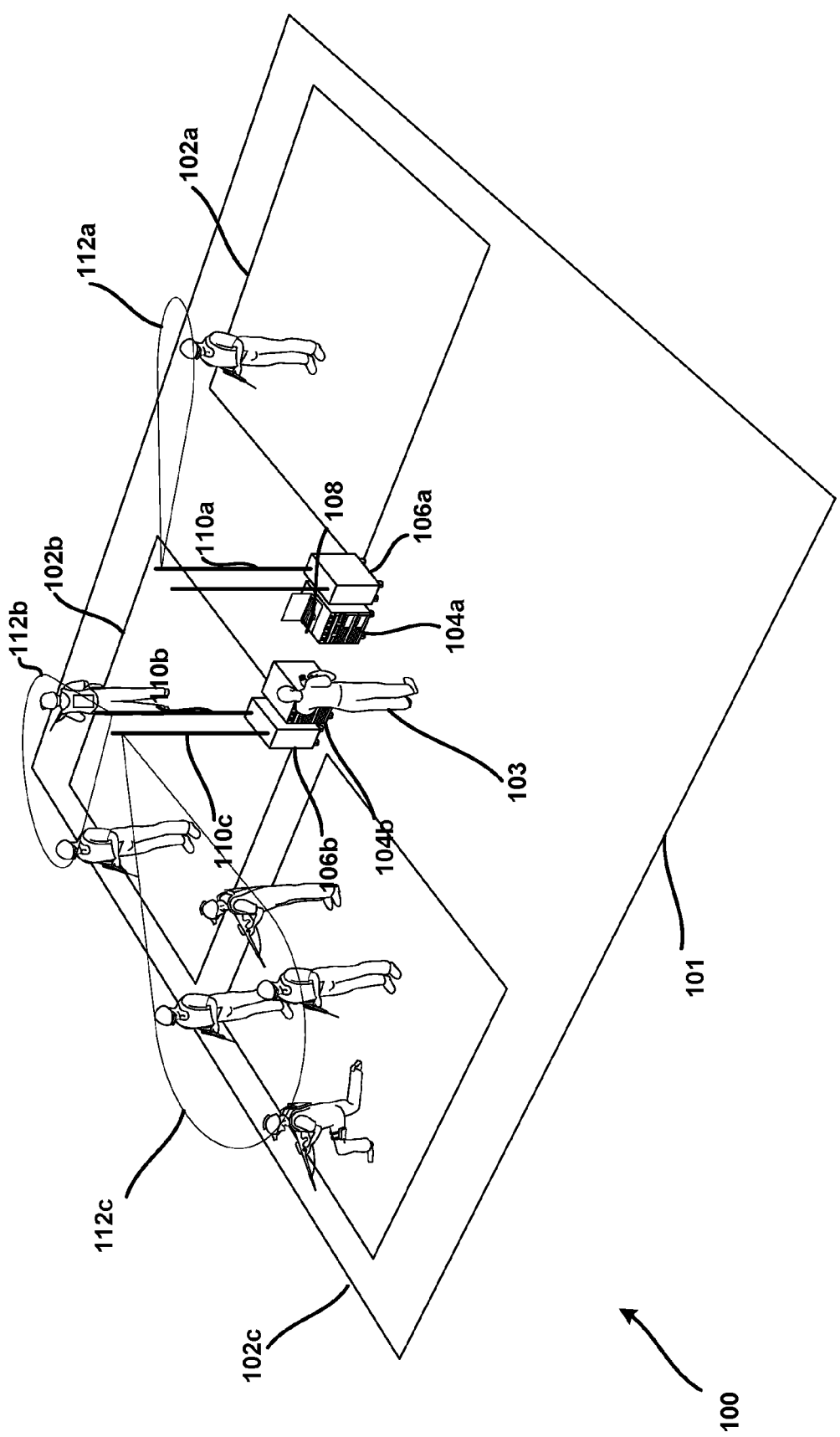
FIG. 1 illustrates a system providing real-time wireless video and audio immersive training to users.

For the purposes of explanation, the ensuing description provides specific details in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

The embodiments disclosed in the following description relate to systems, methods and devices by which realistic immersive simulated training experiences can be provided to users or trainees by wireless communications. The embodiments may provide individual immersive environments to more than one user at a time to provide training for cooperative group actions. Immersive simulated training is advantageous as it eliminates the need for constructing physical training environments, and a great variety of training scenarios can be provided by varying the programming that creates the simulations. Immersive training may allow users or trainees to experience the training scenario without being distracted by actual physical surroundings, such as a training room, that are not part of the simulated training scenario.

Applications include training a soldier or squad of soldiers for street patrols. However, it will be apparent to one of skill in the art that other applications are possible. Alternate applications include training firefighters for entering buildings, and police officers for approaching dangerous situations.

The immersive training may be provided by having each user wear a head-mounted display (HMD) device that displays real-time video of the training scenario on a screen or screens in front of the users face to make the user feel as if he or she is part of the simulated environment. Immersive training may also comprise audio speakers to provide the sounds of the simulated environment. In some embodiments the system, or just the HMD itself, may be completely immersive, in that it prevents a user's ability to receive sights or sounds not provided by the system. In this way the user may more likely become completely mentally engaged in the simulation, and so experience more realistic training.

Training simulations may be created on a computer or computer systems and transmitted and regenerated on the HMD, or other devices, that provide the immersive environment to the user or users. The visual and/or auditory aspects of a training scenario may be generated much more quickly and cheaply using computer graphics software than actually constructing the physical environment. For example, for training a squad of soldiers, visual images of a street and surrounding buildings can be simulated so soldiers can experience patrolling the street. With computer graphics software, the aspects of the street, such as street width and height of surrounding buildings, can quickly be changed to alter the training scenario.

The computer or computer systems may generate entire video sequences of a simulated environment so that a user may view actions within the simulated environment in real-time. Real-time video simulations are those that present successive still images to a user at a rate sufficient for the user to experience no visual delays between images and to experience viewing the images as if physically viewing an actual environment. The computer or computer system may generate video sequences to simulate motion of the user or users through the simulated environment.

Immersive simulated training is more effective in the case that actions by a user are accounted for when generating and presenting the simulated environment to the user. For example, how a soldier moves down a street or where he is looking influences the sounds and visual images that should be presented to the soldier through the HMD and/or other devices. For the computer system to adjust the simulated environment, the computer system must have a way to receive information about the user's actions. In various embodiments, a user has motion and/or orientation sensors attached to various body parts, such as arms, legs, torso and head. The sensors are communicatively linked to the computer system so the computer system can generate the appropriate video image sequence, and other aspects of the simulated environment, to correspond to the position, viewing direction and orientation of the user.

Immersive simulated training is more effective when the user wears the equipment that would be worn if actually in the simulated environment. For example, a soldier might wear a military helmet, body armor, combat boots, a standard pack, and possibly other equipment. A firefighter might wear fireproof garments, oxygen tank, helmet and possibly other equipment. Further, in realistic situations, it is unlikely that a soldier or firefighter would be attached to electronic cabling or wires, or carry a heavy computer system. Thus it is advantageous for an immersive simulated training system to avoid so encumbering the user. In various embodiments disclosed herein, this advantage, among others, is achieved by means of a HMD which receives real-time video image sequences and other aspects of the simulated environment by wireless radio communications transmitted from the a computer system that generates the simulated environment. By separately generating the simulated environment and wirelessly transmitting it to the HMD, the user is enabled to wear the actual equipment that would be worn in the simulated environment. A further advantage to wireless transmission to the HMD of the user is that the computer system used for generating the simulated environment can be separately located and unconstrained in size, and thus comprise much more computing and simulation capabilities than would be possible if the user had to carry a computer for generating and rendering the video or other aspects of the simulated environment.

To achieve greater verisimilitude, in various embodiments sensors attached to a user are disclosed which are designed to fit unobtrusively on or in parts of the equipment that a user might normally use in an actual situation corresponding to the simulation. The sensors may also comprise wireless transmitters and/or receivers so the sensor information can be conveyed to the computer system for adjustment of the simulation.

Further details of the aspects of the embodiments discussed above are now provided with reference the figures.

FIG. 1 illustrates an example of system 100 implementing an immersive simulated training environment, in which a squad of trainee soldiers experiences a training scenario controlled by an operator 103. The simulated environment of the training scenario is shown being generated by computer systems 104*a* and 104*b*, and is shown being transmitted to the soldiers from radio transmitter/receiver systems 106*a* and 106*b*. The users, i.e. the trainee soldiers in the example shown, the operator, the computer system and radio transmitter/receiver systems are located in a training area 101. In various embodiments, the training area may be located in a single building or open outdoor area. The training area may be shielded from electromagnetic or audiotory interference. In the example shown in FIG. 1, the users are organized into three groups in separate locations 102*a*, 102*b* and 102*c* that are in different directions from the radio transmitter/receiver systems 106*a* and 106*b*. As explained more fully below, a respective directional transmission to each group 112*a*, 112*b* and 112*c* may be performed by the radio transmitter/receiver systems.

Examples of a training scenario for soldiers could be a simulated street to be patrolled, the inside of building in which rooms must be searched, or a forest to be traversed. In other examples, the users could be firefighters, and the training scenario could involve a burning house.

In the example shown in FIG. 1, some or all of the users may be equipped with individual head-mounted display (HMD) devices. As described more fully below, an HMD may project real-time video image sequences on display screens mounted in front of the user, and isolate the user from sights or sounds not generated for the training scenario. Some or all of the users may have individual speakers for hearing sounds generated for the training scenario. Some or all of the users may have microphones for transmitting voice responses as part of the training scenario.

In FIG. 1, the training scenario being presented to the users is generated by computer systems 104*a* and 104*b*. As explained more fully below, the computer systems may comprise one or more computers, and may generate a real-time video image sequence corresponding for each of the users. The computer systems may also generate sound signals appropriate for the training scenario being simulated. The computer systems may also execute the software necessary to have the video image sequence and/or other information transmitted to the users.

The computer systems are communicatively linked to radio transmitter/receiver systems 106*a* and 106*b* in order for the video and other aspects of the training scenario to be transmitted to the HMD and other devices associated to each user. In the embodiments shown in FIG. 1 the video signals may be transmitted to particular subgroups of users by directional transmission. One advantage of directional transmission to just a subgroup of users is that less power can used. Another advantage is the ability to use the same frequency for transmission to different subgroups of users. Also, by using multiple computer systems each linked with a corresponding radio transmitter/receiver system using directional transmission to just a subgroup of users, the computer systems can use the computational capabilities more efficiently to generate more realistic video images or other aspects of the training scenario.

Directional transmission may be accomplished using one or more directional antennas on each radio transmitter/receiver system, such as a dish antenna, or by beamforming or beam steering from an antenna array, or by another method as will be apparent to one of ordinary skill in the art. FIG. 1 schematically shows directional antennas 110*a*, 110*b* and 110*c*. Though shown as whip antennas, as stated above the directional antennas could be implemented using other antenna geometries. Further, though shown physically integrated with the radio transmitter/receiver systems in FIG. 1, in some embodiments an antenna may be a separate portable device that is linked with a radio transmitter/receiver system by cabling or wiring at the training area 101 as the need arises. An exemplary embodiment of such a separate antenna is explained below in relation to FIG. 4.

The radio transmitter/receiver systems may also be capable of simultaneous transmission using one or more auxiliary channels other than the channels used for transmitting real-time video image sequences of the training scenario. An advantage would be to allow use of a multiple access communication protocol such as WiFi on an auxiliary channel for voice signaling to and from the users, but reserving the video image channel for transmitting the high data rates needed for real-time video transmissions. In FIG. 1 the use of an auxiliary transmission channel is indicated diagrammatically by the second antenna 108 attached to the radio transmitter/receiver systems 106*a*.

It will be apparent to one of skill in the art that the number of each type of antenna communicatively linked with a radio transmitter/receiver system may be varied according to need.

The particular numbers of operators, users, computer systems, training areas, radio transmitter/receiver systems and antennas shown in FIG. 1 are exemplary only. As will be apparent to one of skill in the art, the number of each may be varied as needed. The embodiments may vary substantially in form and functionality, depending on the desired application.

Figure 2:
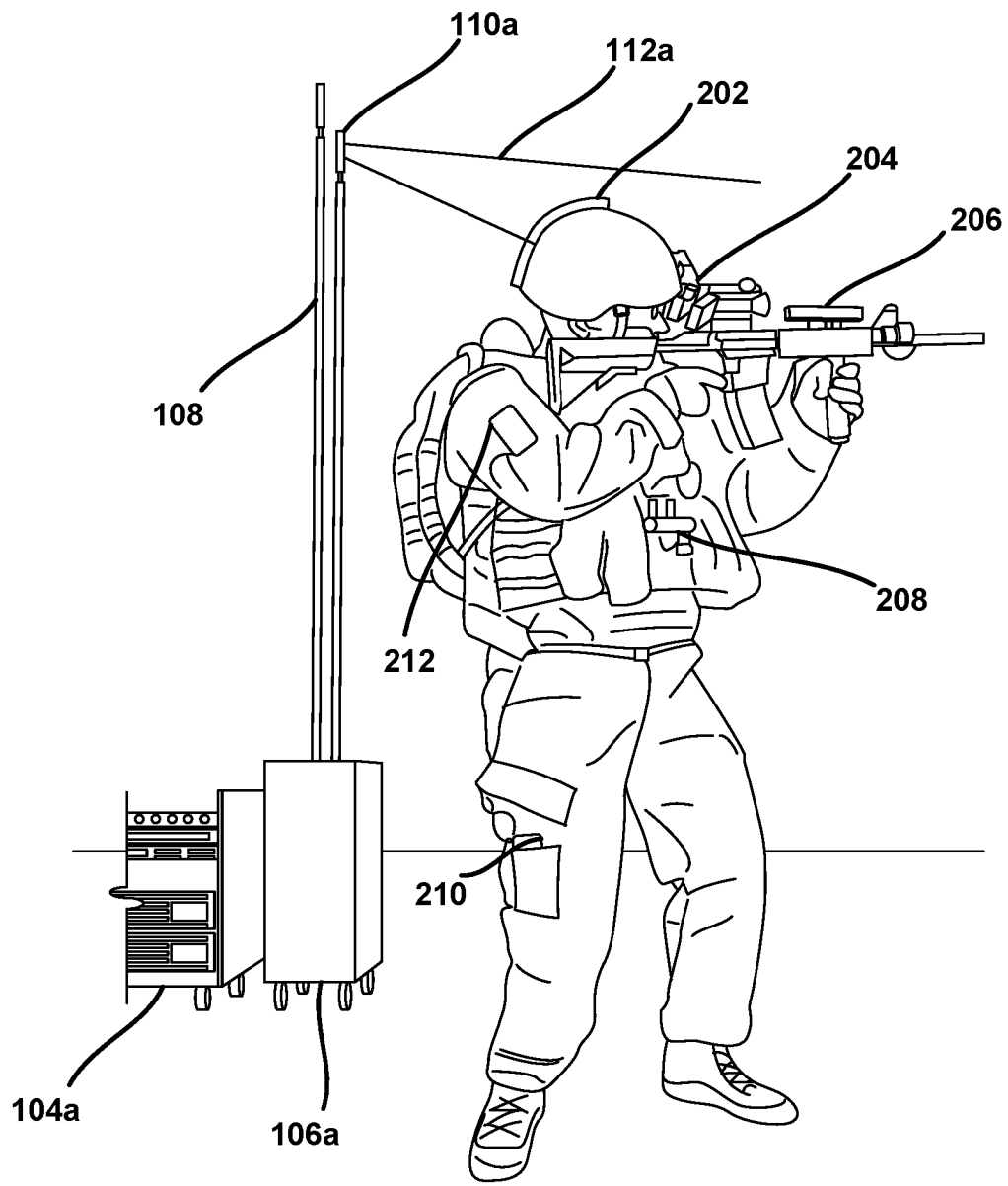
FIG. 2 illustrates a user equipped with wireless sensors and a video display device.

FIG. 2 illustrates an example configuration of various devices that may be attached to a user to implement an immersive simulated training environment. The computer system 104a and a radio transmitter/receiver system 106a as described above are in communication with a user. The communication is illustrated occurring by transmissions from the directional antenna 110a of a real-time video image sequence signal 112 and additional antenna 108 for communications to and/or from a radio transmitter/receiver attached to the user.

As described in detail below, the user may have attached to helmet a HMD 202 and a display screen 204 to receive and display respectively a received video image sequence.

To provide information on the user's responses to the simulation, the user may have attached one or more sensors. The sensors may be able to detect or deduce any combination of motion, orientation or position. The sensors may use gyroscopes, such as ring gyroscopes, accelerometers, or other equipment known to one of skill in the art. As is known to one of skill in the art, position and/or velocity can be inferred by integration of acceleration. Various embodiments of the sensors are described in detail in reference to FIGS. 6, 7, 8, and 9.

Sensor 206 illustrates an orientation and/or motion sensor mounted on a weapon held by the user during the simulation to provide feedback signals to the computer system 104a about how and where the user is pointing the weapon. In other applications, the sensor 206 may be mounted on a different hand-held device. For example, sensor 206 could be mounted a simulation of a firefighter's hose.

Sensor 208 is an orientation and/or motion sensor mounted to the body of the user. Sensor 210 is a leg mounted orientation and/or motion sensor that may be worn inside a pant leg pocket, or attached to the user's leg with straps, as detailed below. There may be one or more such sensor for each leg. Sensor 212 may be an orientation and/or motion sensor attached to the arm of the user. There may be one or more such sensor for each arm.

Figure 3:
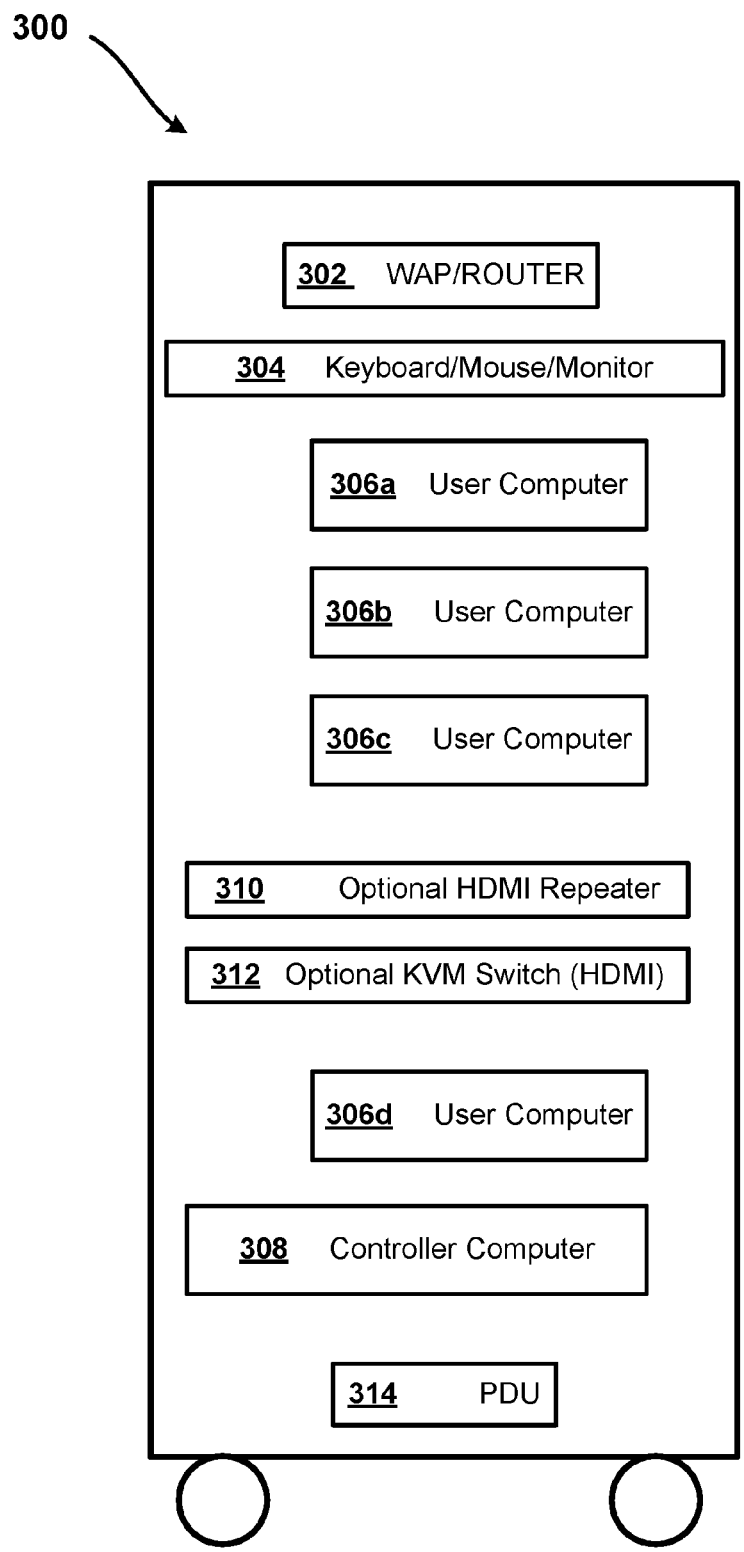
FIG. 3 illustrates a portable carrier for computers and a radio transceiver.

FIG. 3 is a block diagram 300 of a portable rack-mounted computer system and radio transmitter/receiver system, according to one embodiment. An advantage of the embodiment is that the necessary computer system and radio transmitter/receiver system are portable to allow immersive training simulations to be performed in variety of locations. Also, components can be added, upgraded or replaced as needed.

The radio transmitter/receiver system 302 shown in FIG. 3 includes a wireless access point (WAP) and a router. In the embodiment shown, the WAP/router performs the coordinating functions for a wireless local area network (WLAN). The WLAN may be implemented with any of variety of communication protocols, such as WiFi, a version of the IEEE 802.11 standards, a cellular telephone link, or an AM/FM link. Other embodiments of a radio transmitter/receiver system may be used, as known to one of skill in the art. As used herein, a radio transmitter/receiver system may include any combination of the following: a radio transmitter for sending radio signals to an antenna, a modulator for converting a baseband signal to a radio signal for transmission, a radio receiver for receiving a radio signal from an antenna, a tuner for selecting a particular radio channel to receive, a demodulator for converting a received radio signal to a baseband signal, amplifiers and filters for modifying electronic or radio signals, and other components as would be apparent to one of skill in the art. A radio transmitter/receiver system may be implemented as a single unit or as separate units.

In one embodiment, the radio transmitter/receiver system 302 implements a WLAN for receiving sensor data from sensors on one or more users. The system 302 may also be capable of receiving voice data from one or more users. The system 302 may also be capable of transmitting voice or data to one or more users.

The system rack 300 also may include computer monitoring and entry components 304 such as a keyboard, a monitor, and/or a computer mouse. Other components will be apparent to one of skill in the art. The components 304 may also contain a switch to allow an operator to alternate which computer on the rack is being the components connect to.

There may be one or more user computers, 306a, 306b, 306c and 306d, on the rack. In one embodiment, a User Computer is dedicated to generating the simulated training environment for one respective user. A User Computer may execute computer graphics software to generate real-time video image sequences of the simulated environment appropriate for the respective user. The images generated may be based on information about the positions and orientations of sensors attached in various locations on the user, or on an implement held by the user.

The information about the positions and orientations of sensors may be provided to a User Computer by a controller computer 308 from radio signals transmitted by the sensors and received from the WAP/Router 302. The controller computer may also control the transmission of video image sequences over the directional antenna.

An operator may interact with the user computers and/or the controller computer through a keyboard, mouse and/or monitor 304. A simulation may be sent to a monitor from a user computer for output to the operator using an high-definition multimedia interface (HDMI) Repeater 310, and the selection of the user computer selected using a HDMI keyboard/video/monitor switch 312. The rack may have an power distribution unit (PDU) 314 to allow multiple components to be placed on the rack, and ensure safe operation in case of a fault in a component.

Figure 4:
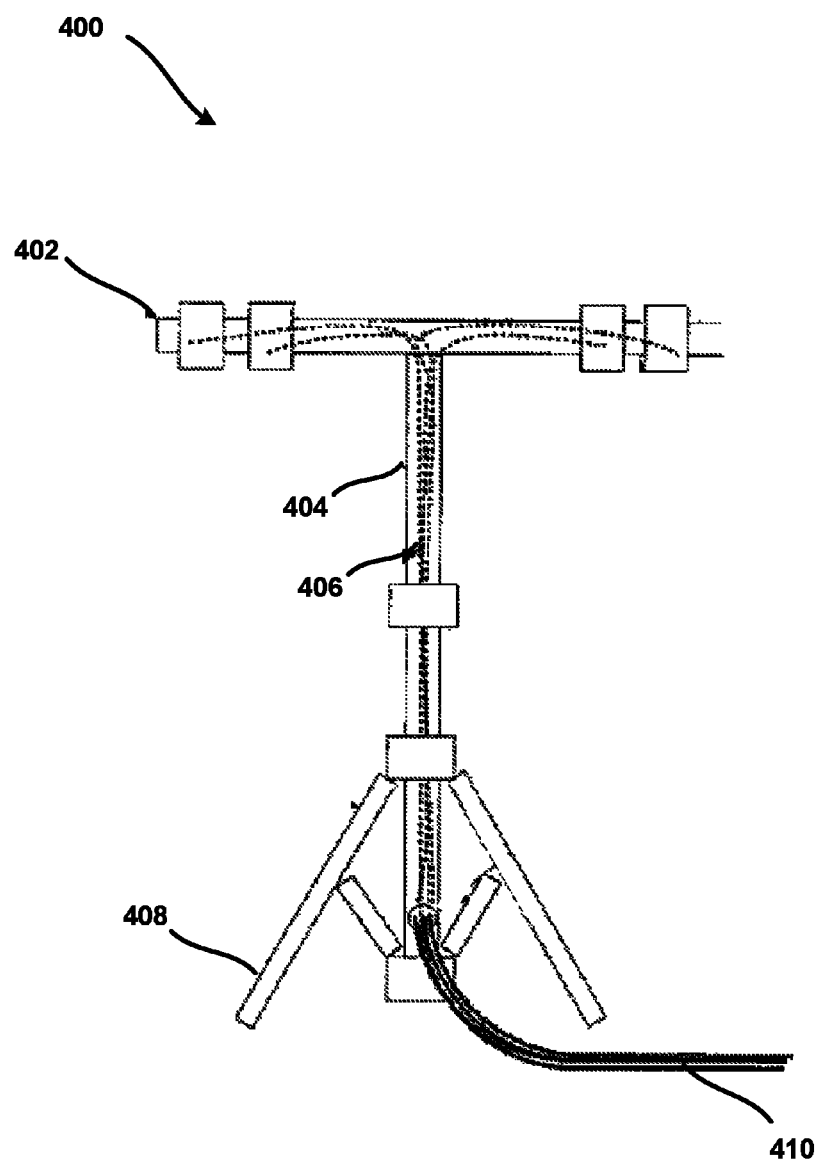
FIG. 4 is a cross-sectional diagram of a display device attached to a user's helmet.

FIG. 4 is an illustration of a directional antenna 400. Other embodiments may combine, separate, and/or substitute components for those shown in FIG. 4. A person of ordinary skill in the art will recognize many variations.

The computer and radio transmitter/receiver system 300 may use more than one such directional antenna to direct communications with various subgroups of users. The directional antenna 400 may be communicatively linked with at least one system 300 by video-capable cabling 410, or other high data rate connections. The cabling 410 is capable of transmitting data at rate sufficient for real-time video image sequences. Non-limiting examples of such cabling include fiber optic cable and coax cable. The video-capable cabling 410 may comprise a bundle of individual cables from separate user computers.

The directional antenna 400 may comprise an antenna array 402 on a horizontal beam. The horizontal beam may be capable of being adjustable in pitch to steer the transmissions. The beam may be capable of being rotated horizontally with respect to the rest of the directional antenna.

The horizontal beam maybe positioned on a vertical, extensible shaft 404. In some aspects the shaft is fixed in length. The shaft 404 may be hollow and the cabling 410 extend inside the shaft's interior 406. The shaft 404 may be supported collapsible legs 408 that extend non-vertically from the shaft. A tripod arrangement for the collapsible legs 408 is shown in FIG. 4, but alternate embodiments, such as four legs, will be apparent to one of skill in the art. In alternate embodiments, the legs 408 supporting the shaft 404 are not collapsible.

In one set of embodiments the directional antenna is used for transmitting the real-time video image sequences of a training scenario generated by the computer system or systems described above. In additional and/or alternate embodiments, the directional antenna may be used for receiving signals transmitted from devices mounted on a user which are described in further detail below.

Figure 5:
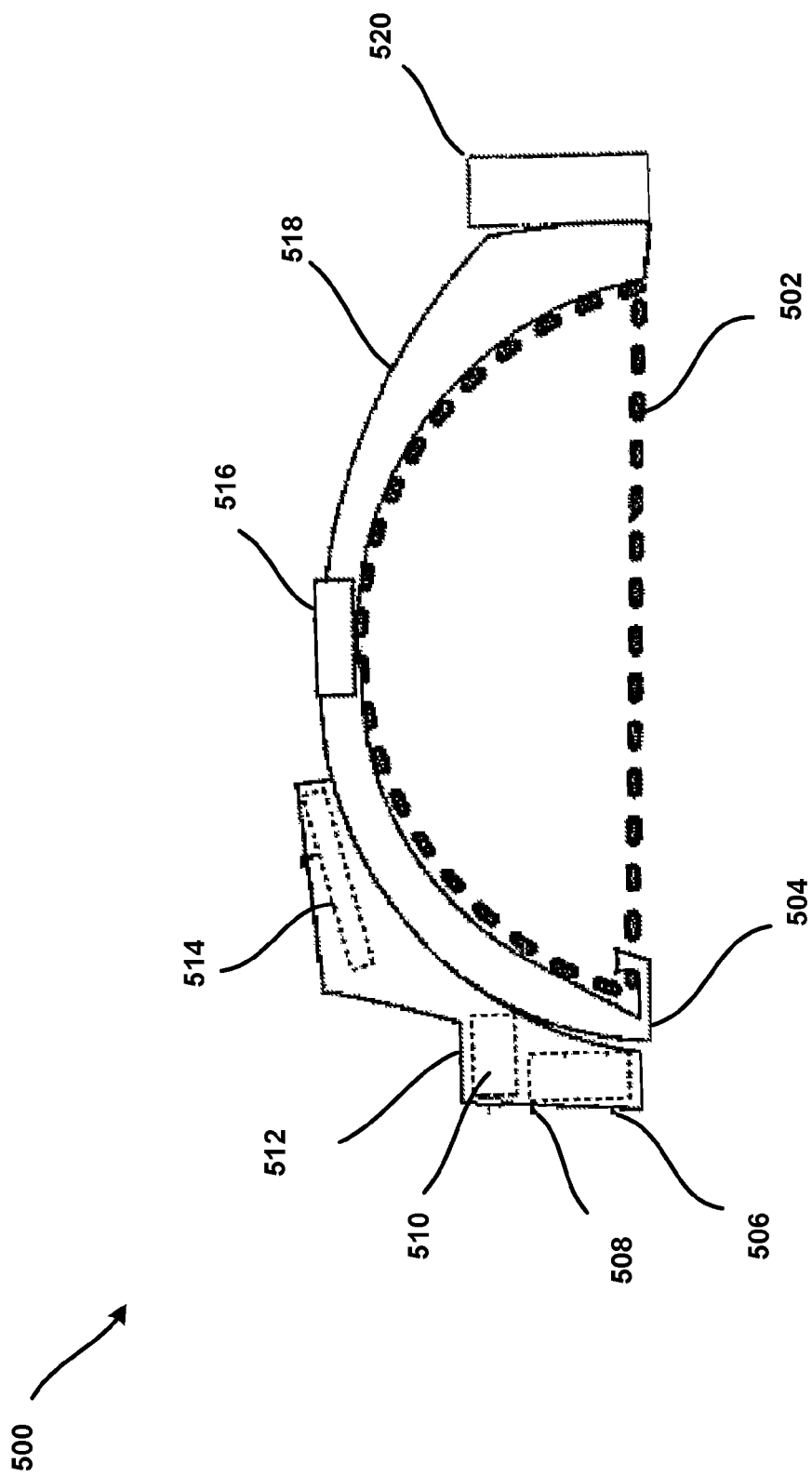
FIG. 5 illustrates a configuration of a directional antenna.

FIG. 5 is a cross-sectional illustration of an embodiment of a head-mounted display (HMD) device 500 and the components therein. In one embodiment, the HMD is attached to a helmet 502 of a user. At the rear (posterior) end of the helmet is an attachment component 504 of the HMD device. The HMD device may also comprise a strap 518 that extends over the exterior portion of the user's helmet attaches to a front mount 520. The tension in the strap may be adjusted by a tensioner 516.

To supply electrical power to electrical components of the HMD device without the use of wires from a remote source, the HMD device may comprise a battery 506. The battery may be rechargeable either by an inductive charger, or by a physical connection such as a cable or wire when not in use. An advantage of the system is that the battery may allow a more realistic simulation for the user by avoiding physically constraining wire or cable connections from the HMD device on the user to a separate power supply.

The status of one or more components of the HMD device may be indicated by one or more light emitting diodes 508. Examples of such a status include on/off, adequate battery voltage or sufficient received radio power.

The HMD device may include a wireless video antenna and receiver assembly 514. The assembly may be configured to receive real-time video image sequences transmitted from the radio transmitter/receiver system 300. To achieve the data rate necessary for real-time video reception, the receiver may comprise an antenna and demodulator configured for signals channels in the 60 GHz band. Examples of 60 GHz band technology is specified in the IEEE 802.11 ad standards. As signals in the 60 GHz band are not able to go through walls, the system 100, when using 60 GHz band for video transmission, operates in a training area without walls, and with the directional antennas raised high enough to transmit throughout the training area. In other embodiments, the assembly 514 may use another communication technology and frequency bands able to transmit real-time video image sequences without delay. The radio channel used for the video channel may be dedicated to download only.

The assembly 514 may also comprise a second radio transmitter/receiver able to transmit and receive on a second radio band. For example, the second radio transmitter/receiver may implement a version of the 802.11 (WiFi) to allow communications within a wireless local area network (WLAN). By communicating over a WLAN transmissions from a user can be received at system 300 and processed to update the simulation in real-time. For example, voice responses of one user can be relayed to other users. Also, data from sensors attached to the user may be transmitted on the WLAN to the computer system 300 and used to modify the video image sequence created for the user.

The HMD may comprise an internal head tracking sensor 510. The sensor may detect the orientation and/or motion of user's head. This may be accomplished by use of gyroscopes, such as ring gyroscopes, or accelerometers. The sensor may comprise electronics to calculate motion and/or position from acceleration data. The head tracking sensor may be battery powered. In an alternate embodiment, a head tracking sensor may be an external component that is connected to the HMD at one or more connection points 512. The connection may include electrical connections. The head tracking sensor may be communicatively linked with the radio transmitter/receiver 514 so that the detected head orientation or motion may be transmitted on the second channel to the computer system 300.

The HMD may comprise a mounting plane 520 to be located at the front of the user's helmet. Attachable to the mounting plane may be one or more video display screens that extend downward from the mounting plane to be positioned immediately in front of the user's eyes so that the user can see only what is on the display. In some embodiments there may two screens capable of displaying stereo images to produce a 3-dimensional video simulation.

The HMD may also comprise a microphone positioned for the user to speak into. The signals from the microphone may be sent to the radio transmitter/receiver 514 for transmission to the computer system 300. The HMD may also comprise audio speakers positioned near the user's ears to receive voice and/or audio transmissions related to the simulation. The voice and/or audio signals to be sent to the speakers may be received on the radio transmitter/receiver 514.

By using one or more of the elements just described, the HMD can provide a user with the experience of being completely or nearly completely immersed in the training scenario being simulated. Verisimilitude can also be enhanced if information about a user's actions, such as voice responses and/or changes in position or orientation, are known by the computer system 300 so that the simulation, including the video image sequences for the user, can be adapted. Determining such user actions may be determined by using sensors attached to the user, as now described.

Figure 6:
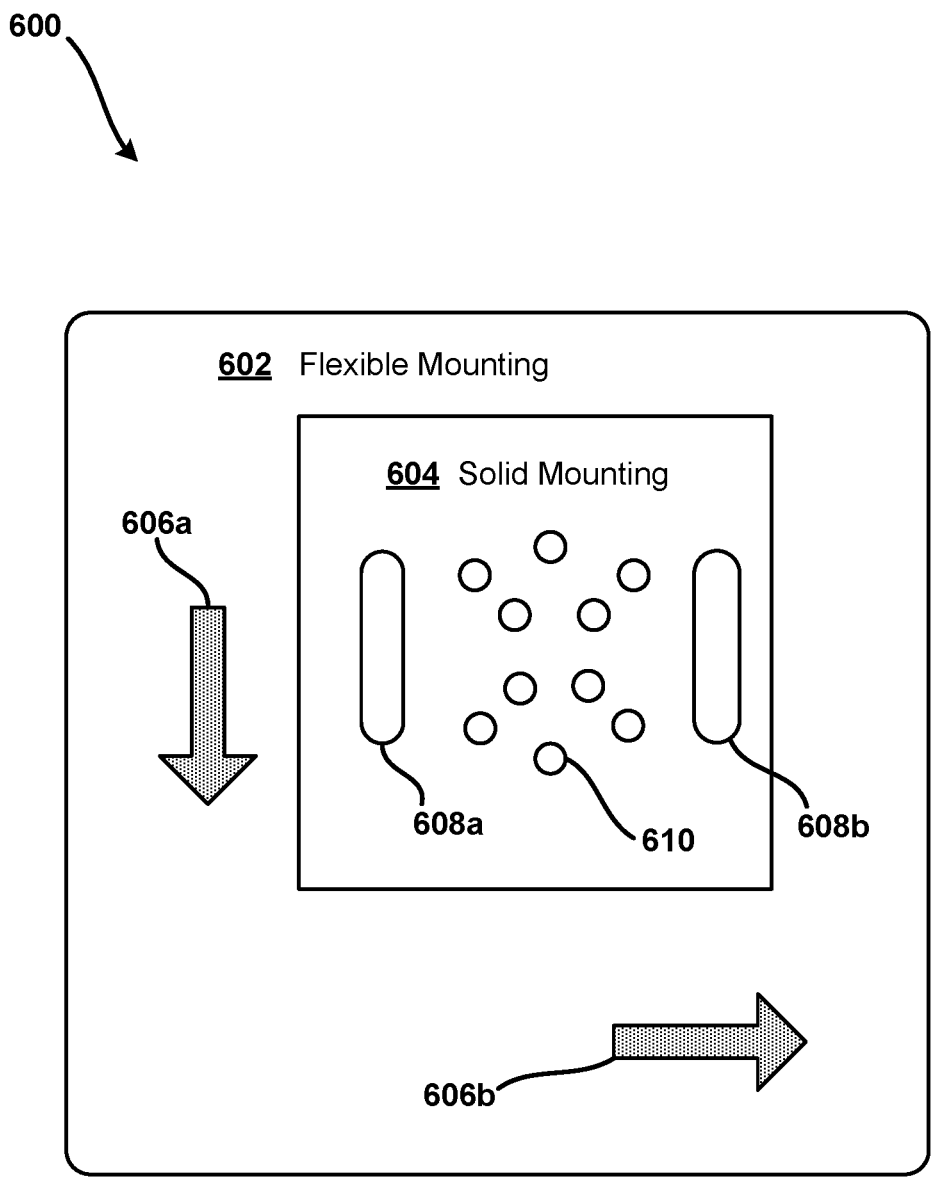
FIG. 6 is a diagram of a first sensor patch.

FIG. 6 is an illustration of an embodiment of leg sensor pocket plate 600. The leg sensor pocket plate (LSPP) may be designed to be inserted into a known pocket of the apparel typically worn by a user. For example, the LSPP may be designed to fit into an outside leg pocket of a soldier's combat uniform. The LSPP may comprise a flexible mounting surface 602. In some embodiments the flexible mounting surface may be of plastic or thin metal sheet so that the LSPP may support a solid mounting component 604, but yet still provide flexibility to fit into a pocket and flex to conform to the shape of a leg. The flexible mounting surface may comprise orientation indicators 606a and 606b, which allow the user to insert the LSPP into a pocket with a correct orientation.

The solid mounting 604 may comprise one or more holes 610 for orientation and motion sensors. The solid mounting may comprise one or more cutouts 608a and 608b to allow for attachment of optional leg sensor straps. The straps may be used either in place of, or in addition to, other means of securing the LSPP.

The LSPP may be attachable to a radio transmitter/receiver to transmit orientation or motion data. Alternatively, the LSPP may have an internal battery powered radio transmitter/receiver. The transmitted data may be transmitted to a radio transmitter/receiver in the HMD, or to a radio transmitter/receiver that is an element of a user hand-held device, as described below.

Figure 7:
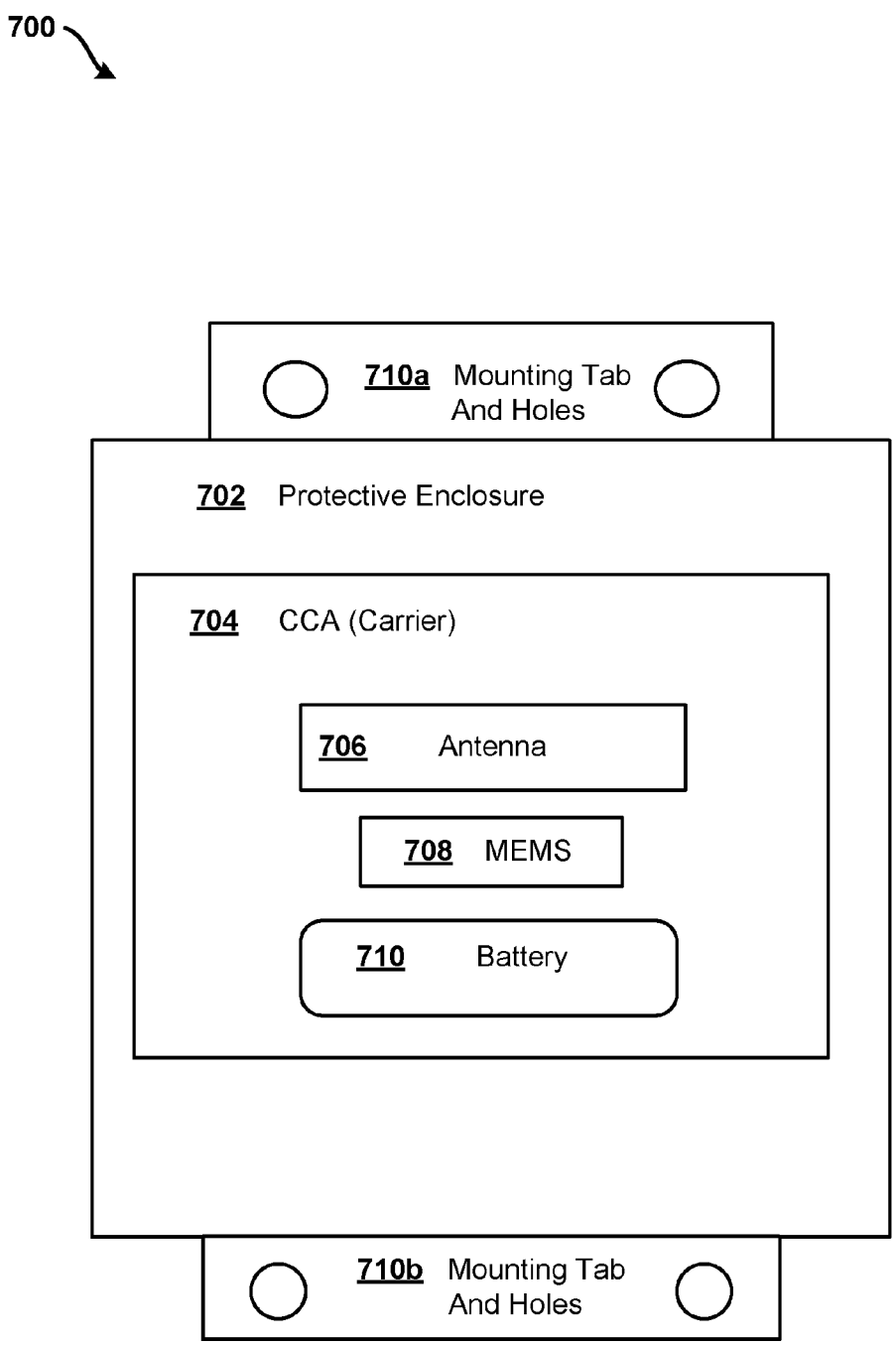
FIG. 7 is a diagram of a second sensor patch.

FIG. 7 is a diagram of an embodiment of a sensor assembly 700. Mounting tabs 710a and 710b allow the sensor assembly to attached to either a user's garments or hand-held device. The mounting tabs are attached to a protective enclosure 702, which may comprise a material such as plastic or metal, and may be sealed to prevent moisture or contaminates from entering the enclosure.

Within the protective enclosure may be a circuit card assembly (CCA) to which may be attached an antenna 706, a microelectromechanical system (MEMS) 708 and a battery 710 to power the MEMS and antenna. The MEMS may implement the operations of orientation or motion sensing, and conversion of the sensed data to electrical form for modulation and transmission over the antenna.

Figure 8:
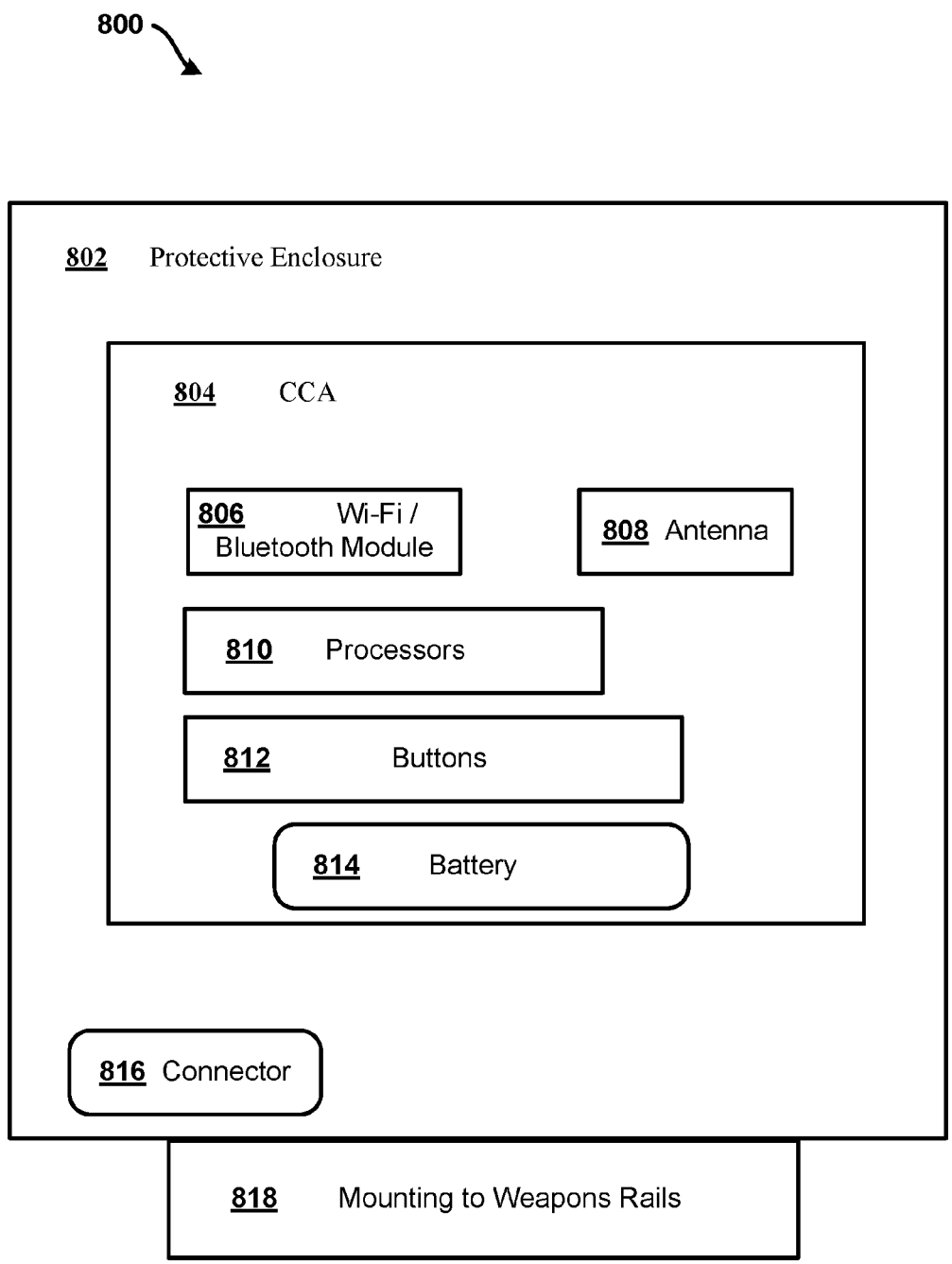
FIG. 8 is a diagram of a sensor-transmitter.

FIG. 8 is diagram of an embodiment of a hub radio transmitter/receiver assembly 800. The hub may allow communication between (1) a plurality of sensors on a user or a user's hand-held device, and (2) a radio transmitter/receiver system, such as 106a and an attached computer system, such as 104a, which is directing a simulation. By wirelessly transmitting data from sensors to a hub radio transmitter/receiver, coordination of sensor data transfer is simplified and interference prevented, and lower power radio transmitter/receiver implementations may be implemented in the sensors, rather than each sensor using a more power consuming WiFi technology for data transmission. Also, wires from the sensors to the hub are eliminated, allowing a user greater freedom of movement.

A protective enclosure 802 as described previously for the sensor assembly 700, may contain a CCA to which is attached an antenna 808, a WiFi or Bluetooth radio transmitter/receiver module 806, one or more processors 810, a battery 814 to provide power to the components on the CCA and one or buttons 812. One of the buttons may be an on/off button, while others may allow a user to change the operational state of processors, or to enter either programming commands or user responses to the simulation.

A connector 816 allows a non-wireless sensor to input data to the hub 800. In the case that the hub is to be mounted to the weapon, or other hand-held device of a user, a sensor on the weapon may have only a direct, e.g. wired, connection and so avoid being equipped with a radio transmitter/receiver. The hub may be attached to a weapon by means of a mounting tab 818.

Other embodiments may combine, separate, and/or substitute components for those shown in FIG. 8. A person of ordinary skill in the art will recognize many variations.

Figure 9:
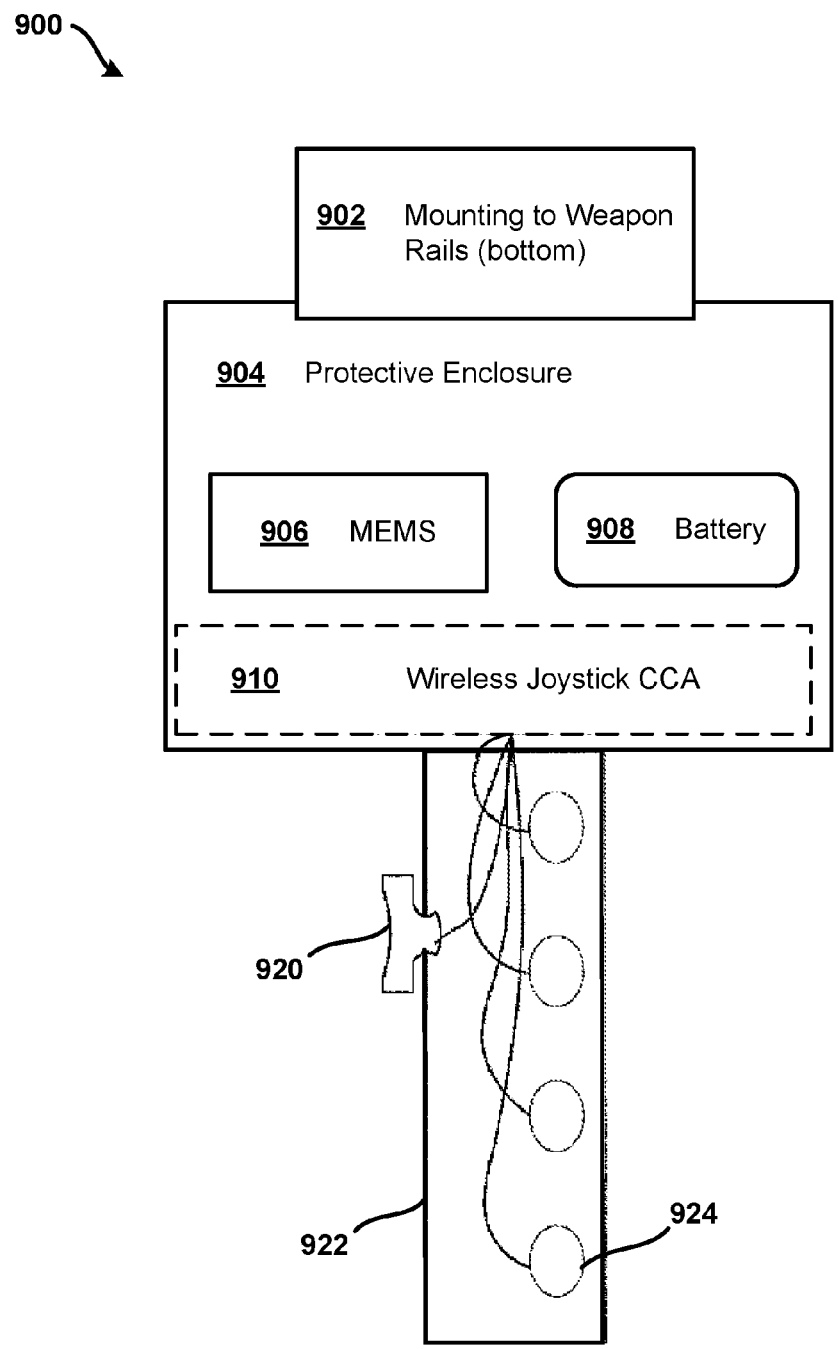
FIG. 9 is a diagram of a second sensor used on a hand-held device.

FIG. 9 is a diagram of an embodiment of an alternate sensor assembly 900. In one embodiment, assembly 900 attaches, using the mounting tab 902, to a weapon held by a user in a simulation. The stock 922 may allow a user to grip and hold a part of a weapon.

Assembly 900 comprises a protective enclosure 904 as described previously. Within the enclosure are a MEMS 906 and a battery 908, both as described previously in regards to FIG. 7. Also illustrated within the protective enclosure may be a wireless joystick CCA 910. The wireless joystick may include a low power radio transmitter/receiver (e.g. Bluetooth or Zigbee) for transmitting data to the hub radio transmitter/receiver 800. In an alternate embodiment, the CCA 910 may connect with the hub 800 by a physical connector.

The data transferred by the joystick CCA 910 may be entered by the user by the buttons 920 and/or 924. Other embodiments may combine, separate, and/or substitute components for those shown in FIG. 9. A person of ordinary skill in the art will recognize many variations.

Figure 10:
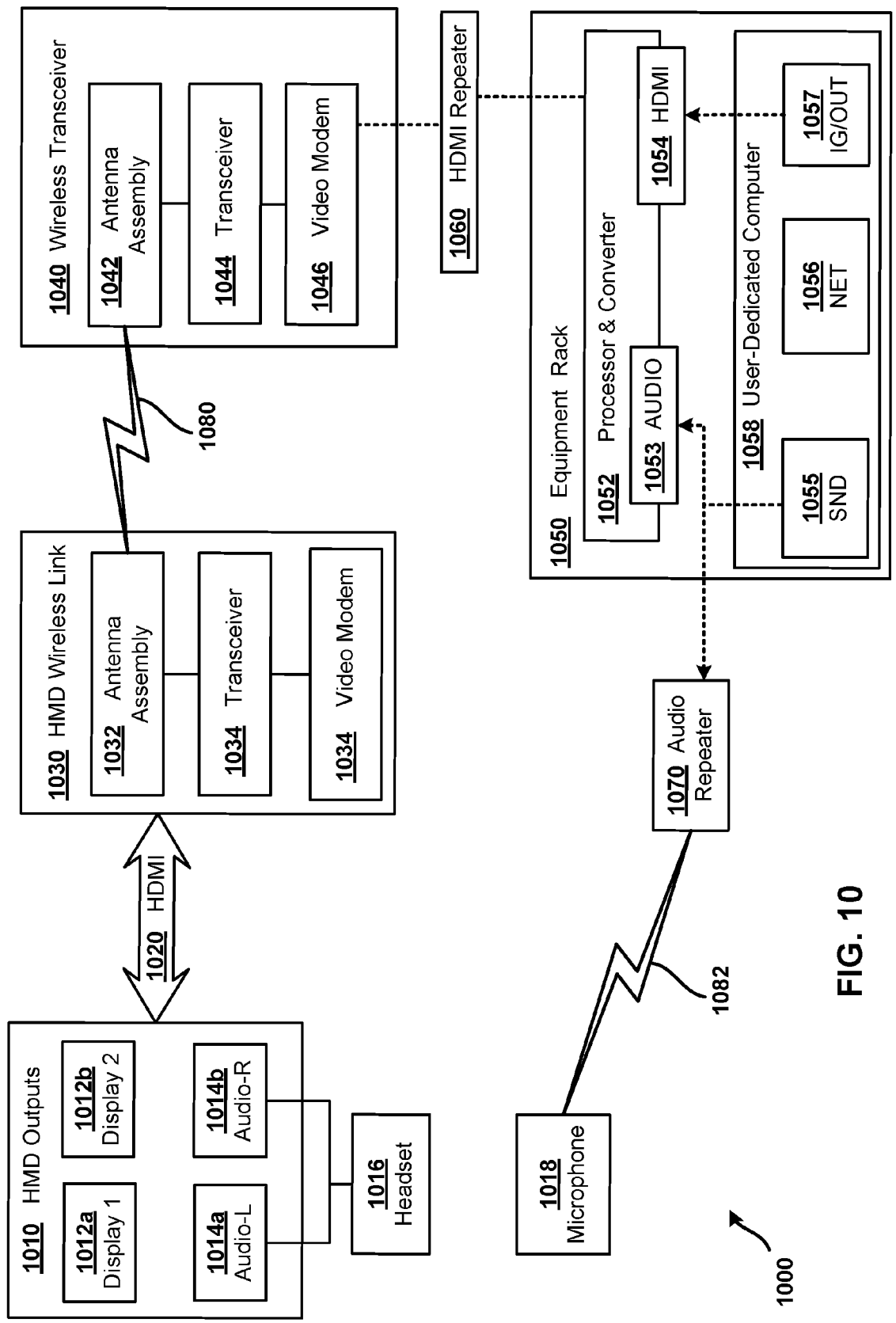
FIG. 10 is a diagram of an wireless architecture for a simulation environment.

FIG. 10 illustrates a block diagram of a wireless video hardware architecture that may implement components of the system 100, as described in reference to the preceding figures.

An equipment rack 1050 may hold the one or more user-dedicated computers 1058, as described in relation to FIG. 3. A user-dedicated computer may also comprise an image generator and image output (IG/OUT) 1057 that generates real-time video image sequences, an Ethernet connection 1056 that allows communication with other computers, and a sound card 1055 for generating or relaying sound transmissions. The user-dedicated computer may also include an audio signal connection 1053 and an HDMI connection 1054 to a controller computer 1052.

The audio component of a simulation may be transmitted on the communication link 1082 by an audio repeater 1070 to a user microphone 1018. The microphone 1018 may include a radio transmitter/receiver to transmit voice or sensor data from the user on the second radio channel distinct from the high data rate channel 1080 that is used for transmitting the real-time video image sequences.

The real-time video image sequence data created by the image generator 1057 is relayed through the HDMI link 1054 to the controller computer 1050 and then transferred over the HDMI repeater 1060 to a wireless transmitter/receiver 1040. The wireless transmitter/receiver 1040 may comprise a video modem 1046 to convert the video image signal to a high data rate transmission format. The formatted signal is then modulated by a transceiver 1044 for radio transmission from the antenna 1042, over the high data rate channel 1080.

A component of an HMD may be a HMD wireless link 1030 to receive the transmitted signal containing the real-time video image sequence. The link 1030 may comprise an antenna assembly 1032, a transceiver 1034 capable of converting the radio signal to an electronic format, and a video modem 1034 for converting the electronic formatted signal into data for display.

The HMD wireless link 1030 may transmit the real-time video image sequence data over an HDMI link 1020 to HMD outputs 1010. The outputs may comprise one or more video display screens 1012a and 1012b, and left and right audio speakers 1014a and 1014b. The speakers may also receive inputs from a headset 1016.

Other embodiments may combine, separate, and/or substitute components for those shown in FIG. 10. A person of ordinary skill in the art will recognize many variations.

Figure 11:
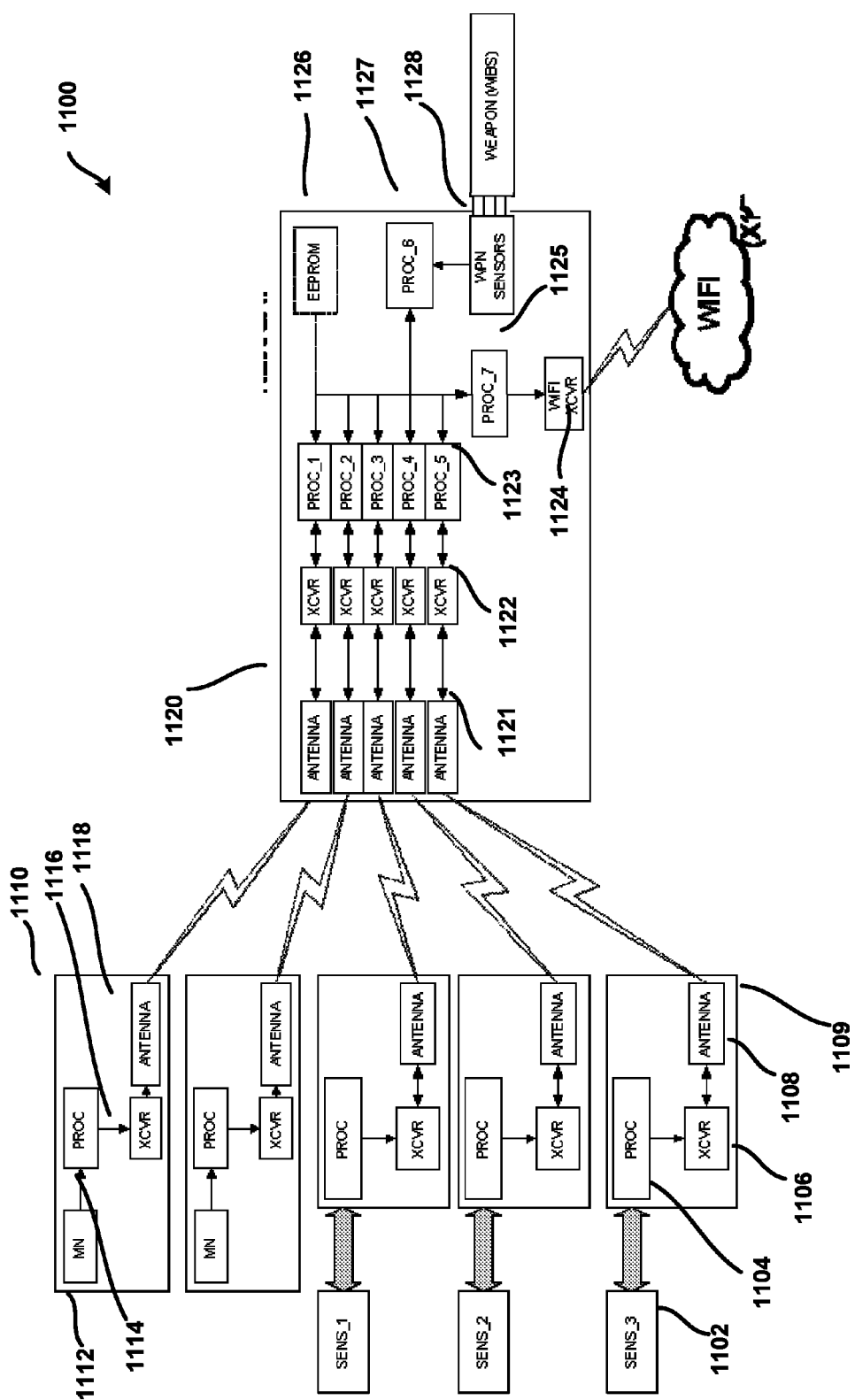
FIG. 11 is a diagram of sensors communicatively linked to a hub transmitter/receiver.

FIG. 11 illustrates a block diagram of a wireless sensor radio hardware architecture 1100. There may be a plurality of sensors, which are exemplified by the orientation and/or position sensor 1102 linked with sensor electronics assembly 1109, and motion and/or orientation sensor 1110. A sensor may comprise a radio transmitter/receiver system capable of wirelessly transmitting radio signals containing acquired sensor data to a hub radio transmitter/receiver device 1120. As detailed below, the hub radio transmitter/receiver 1120 may comprise a plurality of radio transmitter/receiver subsystem, exemplified by components 1121, 1122 and 1123, for wirelessly communicating with the various sensors. The hub radio transmitter/receiver 1120 may also include a second radio transmitter/receiver subsystem, exemplified by components 1124 and 1125, for wirelessly communicating over a WLAN with a WAP linked to a computer system. The hub radio transmitter/receiver may also be directly connected to at least one other sensor, 1128, receiving orientation, position or motion data from a user hand-held device.

In one exemplary application, a user is a soldier being trained in a simulated environment. The sensor 1110 is attached the soldier's leg and is capable of detecting any or all of the motion, position or orientation of the soldier's leg. There may be a pair of such sensors, one for each leg. The sensors may be battery powered, and transmit data by a wireless communication system 1110, so that the soldier is unencumbered by wires during the simulation. The soldier may have mounted on his chest or arms another orientation or motion sensor 1102 connected to the a radio transmitter/receiver 1109 for wirelessly transmitting the data about the orientation or motion. There may be more than one such body sensor, for example there may be a pair of such sensors, one for each arm, and a sensor attached to the chest. each sensor may have a corresponding radio transmitter/receiver system, each of which may use a different frequency for transmission and reception.

In this exemplary application the sensors wirelessly communicate with a hub radio transmitter/receiver 1120. In this application, the hub 1120 may be configured as a single physical unit that attaches to a weapon used by the soldier. Being attached to the weapon allows the hub to communicate with at least one weapon sensor 1128 mounted on the weapon. Such weapon sensors may detect the orientation and/or motion of the weapon. Such a weapon sensor may be connected by wires to the hub radio transmitter/receiver.

In this example the hub radio transmitter/receiver may be able to transmit signals to the sensors on the soldier, 1110 and 1109, for example to coordinate timing of transmission and reception of orientation or other data from the sensors. The hub radio transmitter/receiver may also communicate using a transmitter/receiver 1124, separate from any transmitter/receiver and using a separate radio channel, for communication with a separately located computer system. The separately located computer system may be generating the video or audio components of the simulation.

It will be apparent to one of skill in the art that the exemplary application just described is not limiting, and the architecture 1110 can be applied in a variety of other applications. Another exemplary application would be when the user is a firefighter, and the handheld device is a simulation of a hose. Further details for the components shown in 1100 are now presented.

The sensor 1110 may comprise a motion node 1112, which detects motion. Motion may be detected by as described above in relation to FIGS. 6 through 9. The motion detector may convert its physical measurement to electronic form, and the electronic signals may then be processed by the processor 1114. Such processing may include any of filtering, analog to digital conversion, and modulation for transmission by radio signaling.

The sensor 1110 may include a transceiver 1116 which accepts an electrical signal and transmits the signal using the antenna 1118 to a hub transmitter/receiver 1120. In one embodiment, the transmission is by means of a short range communication protocol such as Bluetooth or Zigbee. The antenna 1118 and transmitter/receiver 1116 may also receive transmissions from hub 1120, which are demodulated and processed by the processor 1114. The received transmissions may include timing and other control commands.

An additional and/or alternate embodiment of sensor is illustrated by the sensor 1102, which is linked to a processor and transmitter/receiver electronics unit, 1109. The link may be by a wire or fiber optic cable to allow the physical sensing unit 1102 to be separate from the electronics unit 1109. This may allow for shielding, and for smaller sensor attachments. The electronics unit 1109 may comprise a processor 1104 capable of performing the operations described for the processor 1114. The electronics unit may also comprise a radio transmitter/receiver 1106 linked with an antenna 1108 for transmitting and receiving signals from the hub transmitter/receiver 1120, as described above in relation to the transmitter/receiver 1116 and antenna 1118.

The hub transmitter/receiver 1120 may comprise a plurality of transceiving circuits comprising an antenna 1121, a transmitting/receiving circuit 1122, and processor 1123. In one embodiment there may be one such combination dedicated to communication with one corresponding sensor. In an alternate embodiment, there may be only one combination of antenna/transceiver/processor and the combination is capable of receiving and transmitting on multiple frequencies simultaneously. The processor 1123 may be able to perform the operations discussed above in regards to the processor 1114.

The hub transmitter/receiver 1120 may comprise a sensor or sensor receiver 1128. This may be a motion or orientation sensor that is a physical part of the hub 1120, or may be a connector, such as jack or wire, by which an external sensor may input data to the hub. The signals from the sensor 1128 may be controlled by processor 1127, which may function as described above.

The hub transmitter/receiver 1120 may comprise memory 1126 on which code for operation of the various components may be stored. The memory may be implemented using electrically erasable programmable read only memory (EEPROM) 1126.

The hub transmitter/receiver 1120 may comprise a processor 1125 and transmitter/receiver 1124 for wirelessly communicating the data received from the sensors to a remote transmitter/receiver, and for receiving information from the remote transmitter/receiver. In one embodiment, the transmitter/receiver 1124 uses WiFi as part of a WLAN, or a similar multiple access communication technology.

Many of the various components and devices described in the preceding sections may use a computer or processor based electronics. These can be implemented in many ways, as now described.

Figure 12:
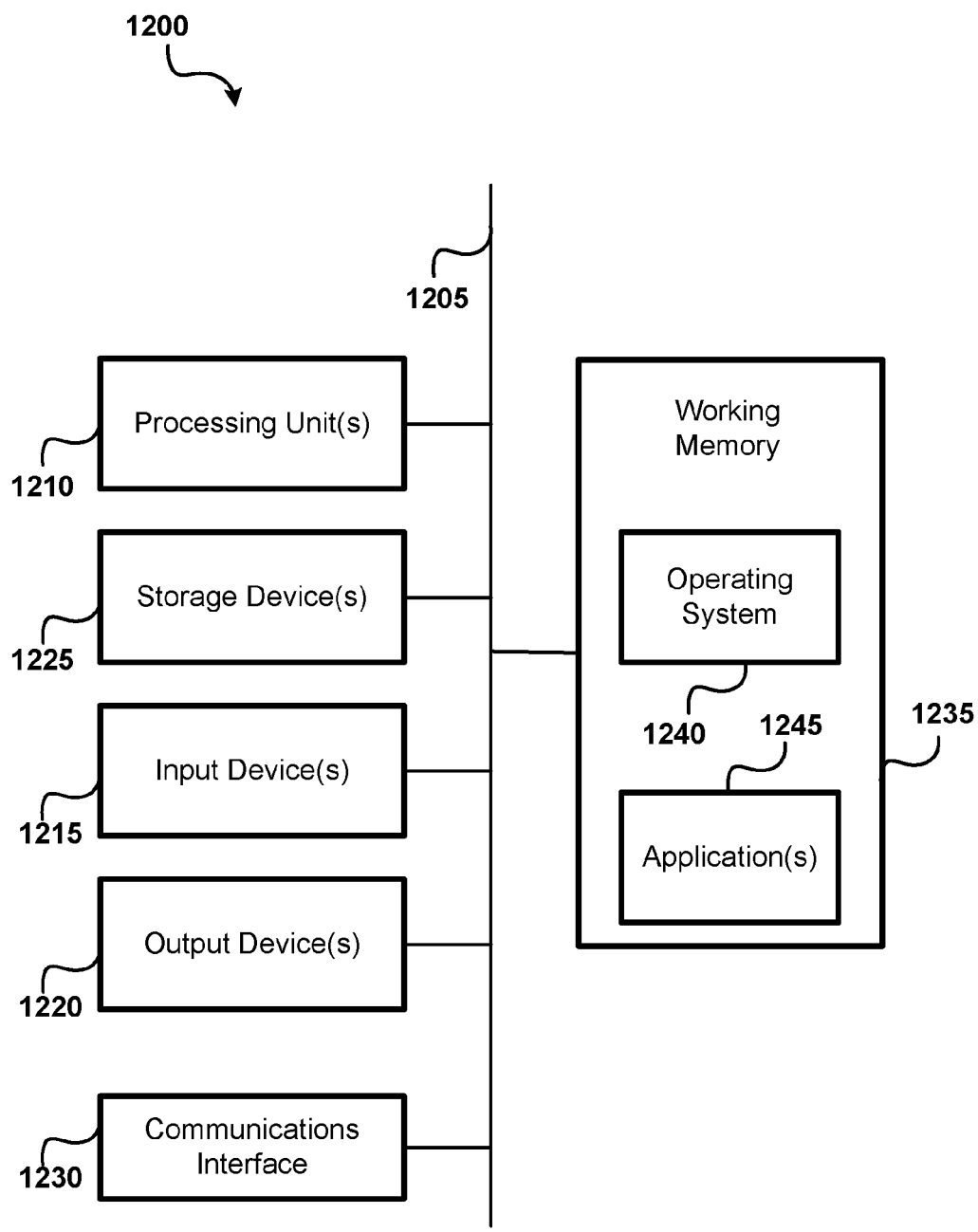
FIG. 12 is a diagram of a computer architecture.

A computer system as illustrated in FIG. 12 may be incorporated as part of the previously described elements of a VTO or as part of the elements at an operator center. FIG. 12 provides a schematic illustration of one embodiment of a computer system 1200 that can perform steps of the methods. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements may include one or more processors 1210, including without limitation one or more general-purpose processors and/or one or more special-purpose processors (such as digital signal processing chips, graphics acceleration processors, and/or the like); one or more input devices 1215, which can include without limitation any of the input devices previously described, as well as a mouse, a keyboard, and/or the like; and one or more output devices 1220, which can include without limitation any of the output devices previously mentioned, as well as a display device, a printer, and/or the like.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1200 might also include a communications subsystem 1230, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 1230 may permit data to be exchanged with a network (such as the network described below, to name one example), other computer systems, and/or any other devices described herein. In many embodiments, the computer system 1200 will further comprise a working memory 1235, which can include a RAM or ROM device, as described above.

The computer system 1200 also can comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the systems and methods discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1225 described above. In some cases, the storage medium might be incorporated within a computer system, such as computer system 1200. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1200) to perform methods in accordance with various embodiments of the invention. According to a set of embodiments, some or all of the procedures of such methods are performed by the computer system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the non-transitory storage device(s) 1225. Merely by way of example, execution of the sequences of instructions contained in the working memory 1235 might cause the processor(s) 1210 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1230 (and/or components thereof) may be the communication component previously discussed, or a separate element of the computer system 1200. Generally the communications subsystem 1230 will receive signals, and the bus 1205 then might carry the signals (and/or the data, instructions, etc. carried by the signals) to the working memory 1235, from which the processor(s) 1210 retrieves and executes the instructions. The instructions received by the working memory 1235 may optionally be stored on a non-transitory storage device 1225 either before or after execution by the processor(s) 1210.

It should further be understood that the components of computer system 1200 can be distributed across a network. For example, some processing may be performed in one location using a first processor while other processing may be performed by another processor remote from the first processor. Other components of computer system 1200 may be similarly distributed.

In the description above and the claims that follow, the word "a" or "an" preceding an element does not exclude the presence of a plurality of such elements.

What is claimed is:

1. A system for transmitting sensor measurement data from a plurality of users within a simulated training environment comprising:
   a system radio transmitter/receiver;
   a hub radio transmitter/receiver configured to couple with a weapon held by a user during a simulated training scenario; and
   a plurality of sensors that are adapted to be attachable to one of the plurality of users, each of the plurality of sensors being linked to a corresponding electronics unit using a wired connection, each corresponding electronics unit comprising a processor, a sensor radio transmitter/receiver, and an antenna that are configured to transmit and receive signals from the hub radio transmitter/receiver, wherein:
      the hub radio transmitter/receiver comprises:
         a plurality of first radio transmitter/receiver subsystems, each of the plurality of first radio transmitter/receiver subsystems being configured to be dedicated for wireless communication with a respective one of the plurality of sensors;
         a second radio transmitter/receiver subsystem that is configured to wirelessly communicate with the system radio transmitter/receiver; and
         a direct wired connection to a weapon sensor of the weapon;
      each of the plurality of sensors that are adapted to be attached to the user transmits sensor measurement data to a respective one of the plurality of first radio transmitter/receiver subsystems of the hub radio transmitter/receiver using the corresponding electronics unit;
      each of the plurality of sensors is configured to measure at least one of orientation, position, and motion;
      the hub radio transmitter/receiver is configured to relay the signals between the system radio transmitter/receiver and the plurality of sensors; and
      the hub radio transmitter/receiver is configured to relay weapons signals between the system radio transmitter/receiver and the weapon sensor.

2. The system of claim 1, further comprising:
   at least one sensor that is in wired communication with the hub radio transmitter/receiver.

3. A system for transmitting sensor measurement data from a plurality of users within a simulated training environment comprising:
   a system radio transmitter/receiver;
   a hub radio transmitter/receiver configured to couple with a weapon held by a user during a simulated training scenario; and
   a plurality of sensors that are adapted to be attachable to one of the plurality of users, each of the plurality of sensors being linked to a corresponding electronics unit using a wired connection, each corresponding electronics unit comprising a processor, a sensor radio transmitter/receiver, and an antenna that are configured to transmit and receive signals from the hub radio transmitter/receiver, wherein:
      the hub radio transmitter/receiver comprises:
         a plurality of first radio transmitter/receiver subsystems, each of the plurality of first radio transmitter/receiver subsystems being configured to be dedicated for wireless communication with a respective one of the plurality of sensors;
         a second radio transmitter/receiver subsystem that is configured to wireless communicate with the system radio transmitter/receiver; and
         a direct wired connection to a weapon sensor of the weapon;
      each of the plurality of sensors that are adapted to be attached to the user transmits sensor measurement data to a respective one of the plurality of first radio transmitter/receiver subsystems of the hub radio transmitter/receiver using the corresponding electronics unit;
      each of the plurality of sensors is configured to measure at least one of orientation, position, and motion;
      the hub radio transmitter/receiver is configured to relay the signals between the system radio transmitter/receiver and the plurality of sensors;
      the hub radio transmitter/receiver is configured to relay weapons signals between the system radio transmitter/receiver and the weapon sensor; and
      at least one of the plurality of sensors is adapted to be attachable to a leg of an apparel worn by one of the plurality of users.

4. The system of claim 3, wherein:
   the sensor attachable to the leg of the apparel worn by the one of the plurality of users comprises an orientation indicator and is configured to be inserted into a pocket of the apparel worn by the one of the plurality of users.

* * * * *